United States Patent
Bull et al.

(10) Patent No.: US 7,475,422 B1
(45) Date of Patent: Jan. 6, 2009

(54) SECURING INTERNET BROWSER-BASED EMAIL SYSTEM THROUGH SESSION MANAGEMENT

(75) Inventors: Damon R Bull, Beaverton, OR (US); Mark Trbojevic, Beaverton, OR (US); Venkataravikumar Dadi, Fremont, CA (US); Joerg Droste, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/031,739

(22) Filed: Feb. 15, 2008

(51) Int. Cl.
G06F 15/16 (2006.01)
G06F 3/00 (2006.01)

(52) U.S. Cl. .......................... 726/3; 709/204; 709/229; 715/742

(58) Field of Classification Search ................. 726/3; 709/204; 715/742
See application file for complete search history.

(56) References Cited

U.S. PATENT DOCUMENTS

| | | | |
|---|---|---|---|
| 6,412,070 B1 * | 6/2002 | Van Dyke et al. ............. 726/17 |
| 6,633,311 B1 | 10/2003 | Douvikas et al. |
| 6,701,345 B1 * | 3/2004 | Carley et al. ................. 709/205 |
| 7,069,575 B1 * | 6/2006 | Goode et al. .................. 725/86 |
| 7,289,973 B2 * | 10/2007 | Kiessig et al. ................. 707/1 |
| 7,299,284 B2 | 11/2007 | McKinnon, III et al. |
| 7,346,692 B2 * | 3/2008 | Watanabe et al. ............ 709/228 |
| 7,376,652 B2 * | 5/2008 | Hayes-Roth ................... 707/9 |
| 2003/0197735 A1 | 10/2003 | Woltzen |
| 2004/0230663 A1 | 11/2004 | Ackerman |
| 2006/0072723 A1 | 4/2006 | Chung |
| 2006/0277261 A1 * | 12/2006 | Paramasivam et al. ...... 709/206 |
| 2007/0033637 A1 | 2/2007 | Yami |

* cited by examiner

*Primary Examiner*—Matthew Heneghan
(74) *Attorney, Agent, or Firm*—Maxvalue IP, LLC

(57) ABSTRACT

One embodiment provides a process which will limit multiple active sessions of the same e-mail account to be active in multiple computers. Moreover, this embodiment allows the user of the email system to query the active session on the network with the ability to disable the active session in order to have the ability to open a new session from the user's present location. The process is done by querying a session database to find the state of the e-mail account if the first login attempt fails because of another open session. These safeguards are introduced to prevent multiple login sessions to an Internet Browser based email service for given login credentials.

1 Claim, 2 Drawing Sheets

SECURING INTERNET BROWSER-BASED EMAIL SYSTEM THROUGH SESSION MANAGEMENT

BACKGROUND OF THE INVENTION

Email systems facilitate the exchange of electronic mail over a network, such as a LAN (local area network), WAN (wide area network), or public network (e.g., Internet). Most people are familiar with traditional computer email systems based on a client server model. With intense need for global communications, email systems migrated more towards the thin client model running inside a browser. These thin clients are typically constructed with just enough functionality to enable access to the server computer over a network. Browser-based email systems are well suited for thin clients. The client mailbox is maintained at a server and the client accesses the mailbox using standard Web protocol.

With current web based email systems, a validated user can login to the same account multiple times, from multiple locations. This can cause problems with the mail system databases when the same data is viewed and manipulated from multiple active locations with no real-time checking or blocking of subsequent login attempts when an existing validated login session is active at some other location. Some existing solutions expire the earlier active session instead of blocking a subsequent session.

SUMMARY OF THE INVENTION

This embodiment provides a process which will limit multiple active sessions of the same e-mail account to be active in multiple computers in a LAN, WAN or Internet. Although, this invention will allow the user of the email system to query the active session on the network with the ability to disable the active session in order to have the ability to open a new session from the user's present location. The process is done by querying a session database to find the state of the e-mail account if the first login attempt fails because of another open session.

These authentication safeguards are introduced to prevent multiple login sessions to an Internet Browser based email service for given login credentials. This feature secures and protects the active user account from unauthorized access by allowing only one active session to the account.

Advantages are:
  There is always only one active session per identity
  High level integrity and more trusted email system
  Individual Privacy protection

DETAILED DESCRIPTION OF THE PREFERRED EMBODIMENTS

One embodiment provides a process by which a session database is queried that defines the state of the account. If the account is open and actively being accessed via a session that provided the correct login credentials, the subsequent login attempt would be rejected with an error message stating this session is already open and active. The process would allow for the owner of the account to override the rejected login attempt in the case the owner wishes to close the open session and open a new session on the different computer. Session information would be based on an ID such as IP address so that the owner could be alerted to the fact that they may have an existing browser session open on the same machine they are trying to use to login in a second time. This ID tracking would also allow the owner to be notified if there is an unauthorized session open on an unknown IP address and allow the owner of the account to close that session and to allow for appropriate security measures to take place to secure the account from future unauthorized access. In addition, the owner would be able to review past login session attempts, both successful and unsuccessful, and from which IP address the login attempt was made, creating an audit trail for any security forensics investigations.

Figure 1:
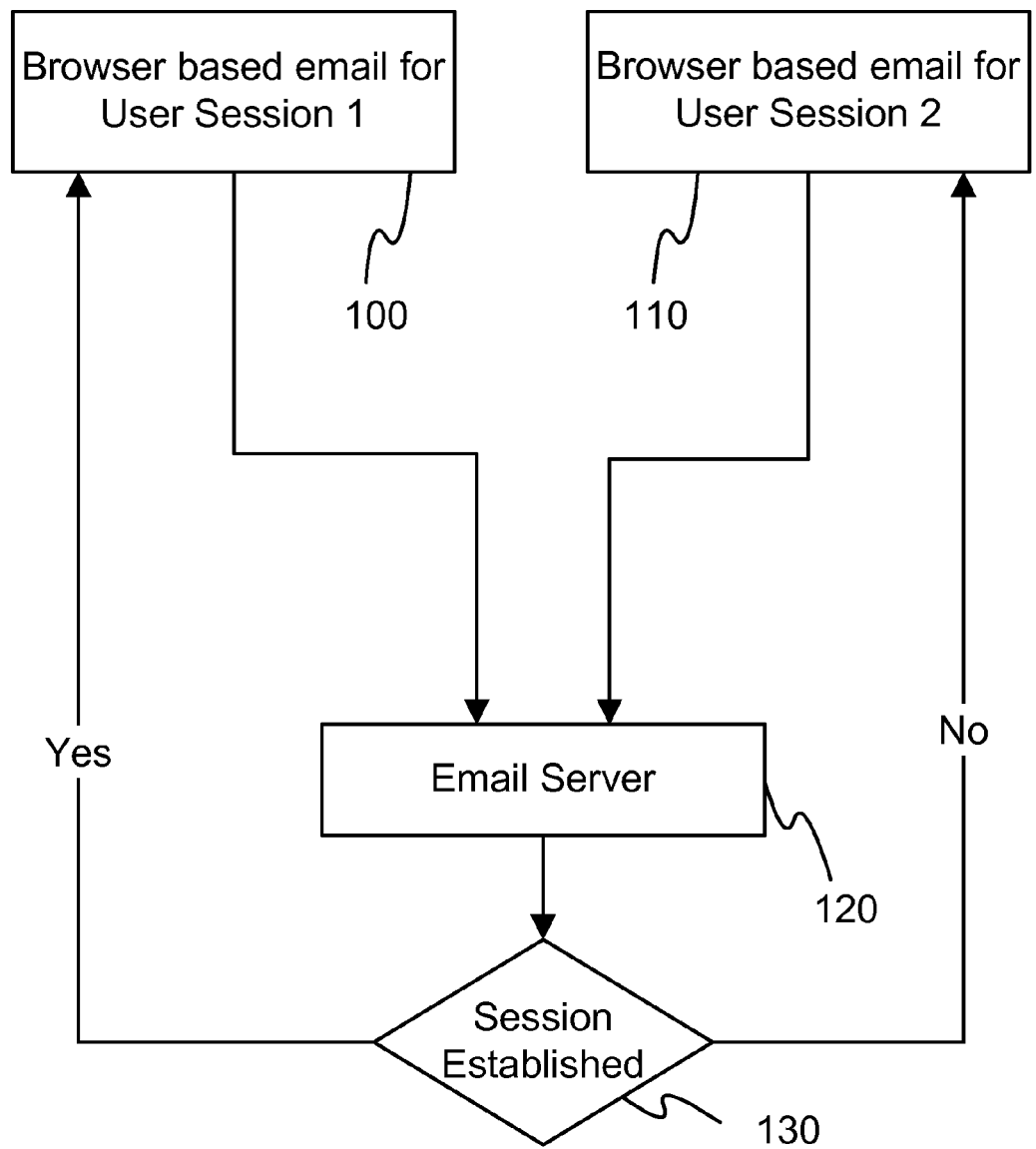
FIG. 1 is a schematic diagram of the system.

FIG. 1 depicts an attempt by a user (100) to access an email account (120) through a web based email client. While the session is active another attempt (110) is made to access the same account. The session is only established (130) for the first attempt, and the second attempt is rejected.

Figure 2:
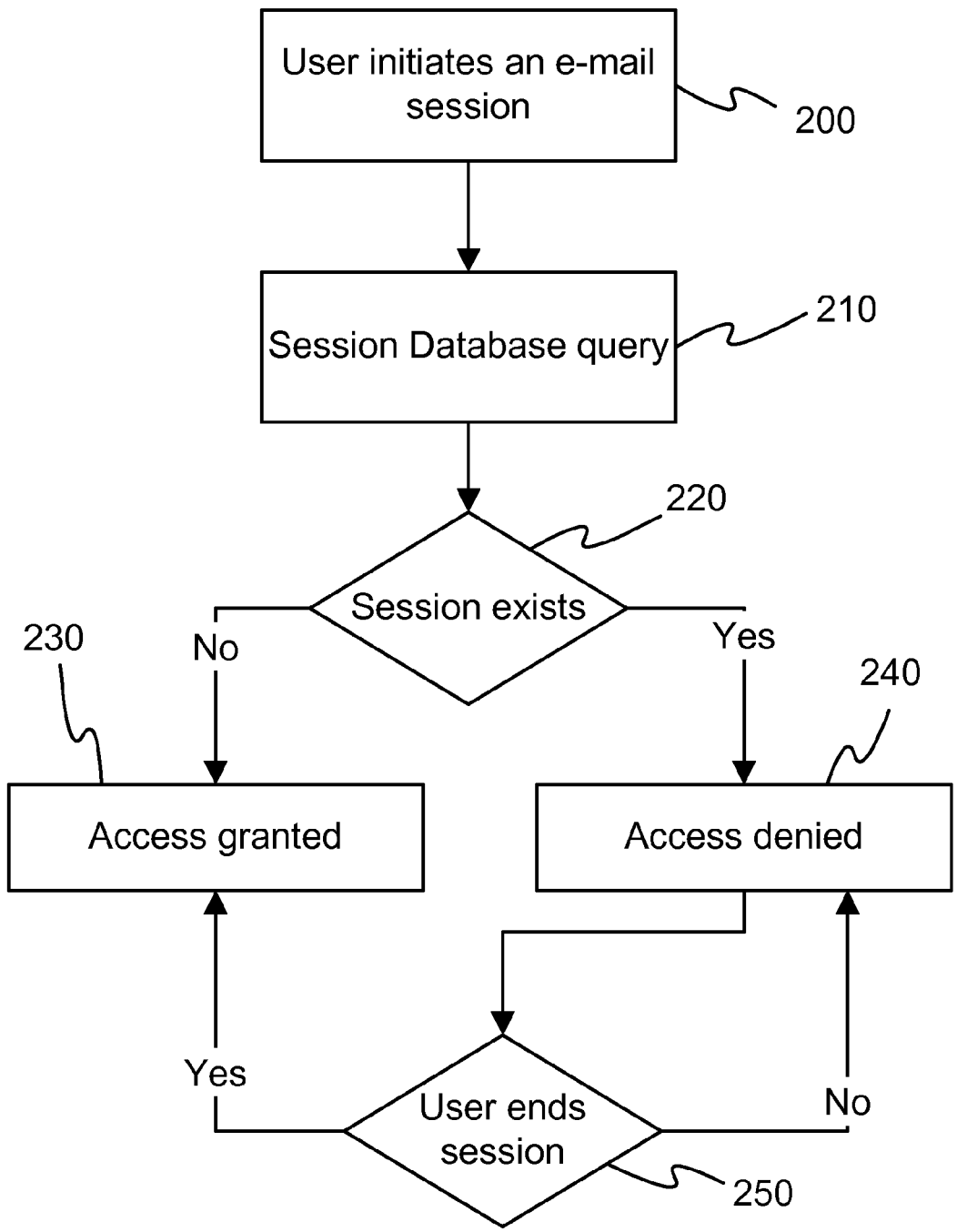
FIG. 2 is a step by step flow diagram of the system.

FIG. 2 depicts a step by step decision flow of the invention. The user initiates (200) a session to access an email account. Session database query (210) determines whether or not a session for the same account is presently active (220). Access is granted in absence of an active session (230). Consequently access is denied if a session exists (240), but the user is presented with a decision to end the earlier session (250).

In one embodiment, in the earlier active session, the server detects if the user has requested to perform an email action such as drafting a new email, replying to an email, or forwarding an email where the action has not been completed via a send function. In that case, if the user elects to override the rejected login attempt, the user is additionally prompted with a warning that such incomplete actions may be pending at the earlier active session. Upon such warning, the user is given a choice to continue or cancel the login attempt.

In one embodiment, multiple authorized users access same group email account. Based on a preconfigured setting various IDs are given different priorities in order to modify the rejection/prompting behavior of the email server based on those priorities at the login attempt while there is an earlier active session. For example, a lower priority IDs cannot override the rejected login attempt if the ID associated with the existing active session has a higher priority. Otherwise, the user at the rejected login attempt is given an option to override the rejected login attempt. If the ID of the user at the login has an override attribute, any existing active session is expired.

Below is another embodiment of the present invention:

A method for securing an Internet browser-based email system, the method comprising:

A first user logs in to the email system using a first Internet browser, an email account, and an email account credential. The first user logging in is associated with a first session and the first session is active and the first session is associated with a first identifier. The first identifier is a first IP address of a first device and the first Internet browser runs on the first device.

The email system registers a record that identifies the first session, the email account, and the first identifier in an active session database. A second user logs in to the email system using a second Internet browser, the email account, and the email account credential. The second user logging in is associated with a second session. The second session is associated with a second identifier. The second identifier is a second IP address of a second device and the second Internet browser runs on the second device.

The email system queries the active session database based on the email account to find the record. The email system identifies the first session and the first identifier from the record. The first identifier is preconfigured with a first priority, and the second identifier is preconfigured with a second priority, in the email system.

If the second priority is lower than the first priority, then the email system rejects the second user logging in to the email system. If the second priority is not lower than the first priority and the second identifier is not in a set of overriding identifiers, then the email system prompts the second user with an active session that warns and gives the second user a first choice between canceling the second session or continuing with the second session.

The active session warning identifies the first identifier. If the second user elects to continue with the second session in the first choice, then the email system determines whether the first user has any one of email sending actions in progress in the first session. The email sending actions are comprised of composing new email, replying to email, and forwarding email.

If the second user elects to continue with the second session in the first choice and the first user has any one of the email sending actions in progress in the first session, then the email system prompts the second user with a work-in-progress session warning and gives the second user a second choice between canceling the second session or continuing with the second session.

If the second user elects to continue with the second session in the second choice, then the email system expires the first session and makes the second session active. If the second user elects to continue with the second session in the first choice and the first user does not have any of the email sending actions in progress in the first session, then the email system expires the first session and makes the second session active. If the second identifier is in the set of overriding identifiers, then the email system expires the first session and making the second session active.

A system, apparatus, or device comprising one of the following items is an example of the invention: browser, Internet, e-mail system, email server, security module, UI, ID, ID tracker, IP address, storage for addresses, server, client device, PDA, mobile device, cell phone, storage to store the messages, router, switches, network, communication media, cables, fiber optics, physical layer, buffer, nodes, packet switches, computer monitor, or any display device, applying the method mentioned above, for purpose of security and session management.

Any variations of the above teaching are also intended to be covered by this patent application.

The invention claimed is:

1. A method for securing an Internet browser-based email system, said method comprising:
   a first user logging in to said email system using a first Internet browser, an email account, and an email account credential;
   wherein said first user logging in is associated with a first session;
   wherein said first session is active;
   wherein said first session is associated with a first identifier;
   wherein said first identifier is a first IP address of a first device;
   wherein said first Internet browser runs on said first device;
   said email system registering a record identifying said first session, said email account, and said first identifier in an active session database;
   a second user logging in to said email system using a second Internet browser, said email account, and said email account credential;
   wherein said second user logging in is associated with a second session;
   wherein said second session is associated with a second identifier;
   wherein said second identifier is a second IP address of a second device;
   wherein said second Internet browser runs on said second device;
   said email system querying said active session database based on said email account to find said record;
   said email system identifying said first session and said first identifier from said record;
   wherein said first identifier is preconfigured with a first priority, and said second identifier is preconfigured with a second priority, in said email system;
   if said second priority is lower than said first priority, then said email system rejecting said second user logging in to said email system;
   if said second priority is not lower than said first priority and said second identifier is not in a set of overriding identifiers, then said email system prompting said second user with an active session warning and giving said second user a first choice between canceling said second session or continuing with said second session;
   wherein said active session warning identifies said first identifier;
   if said second user elects to continue with said second session in said first choice, then said email system determining whether said first user has any one of email sending actions in progress in said first session;
   wherein said email sending actions comprise composing new email, replying to email, and forwarding email;
   if said second user elects to continue with said second session in said first choice and said first user has any one of said email sending actions in progress in said first session, then said email system prompting said second user with a work-in-progress session warning and giving said second user a second choice between canceling said second session or continuing with said second session;
   if said second user elects to continue with said second session in said second choice, then said email system expiring said first session and making said second session active;
   if said second user elects to continue with said second session in said first choice and said first user does not have any of said email sending actions in progress in said first session, then said email system expiring said first session and making said second session active; and
   if said second identifier is in said set of overriding identifiers, then said email system expiring said first session and making said second session active.

* * * * *